Nov. 14, 1961   K. M. ROYER ET AL   3,008,235
MOLDING PRESS AND METHOD
Filed Jan. 6, 1958   2 Sheets-Sheet 2
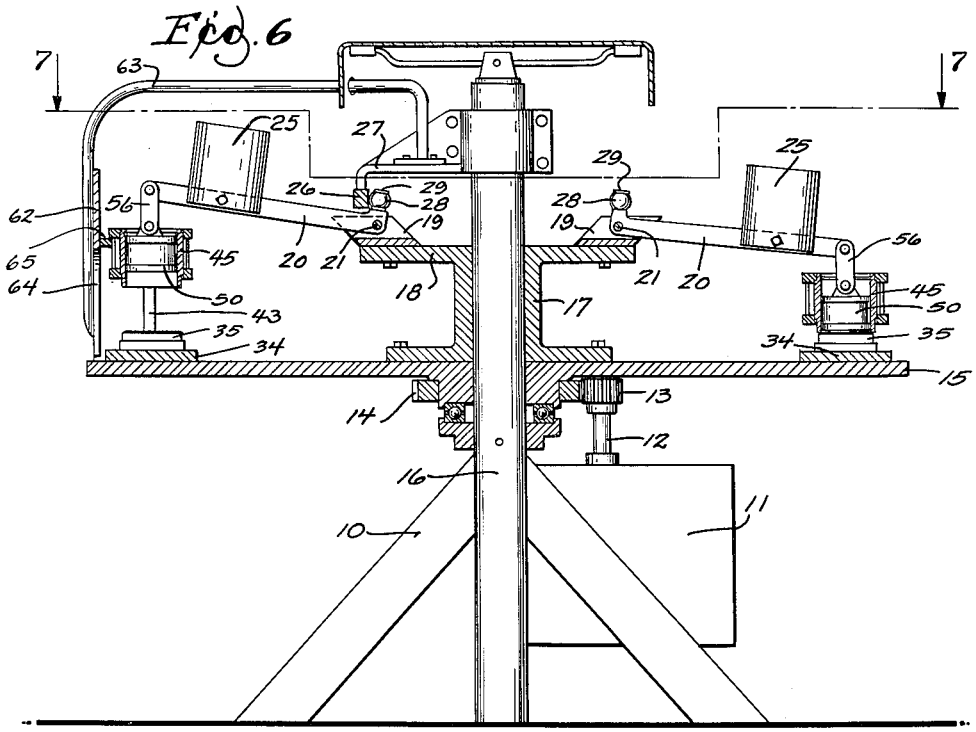
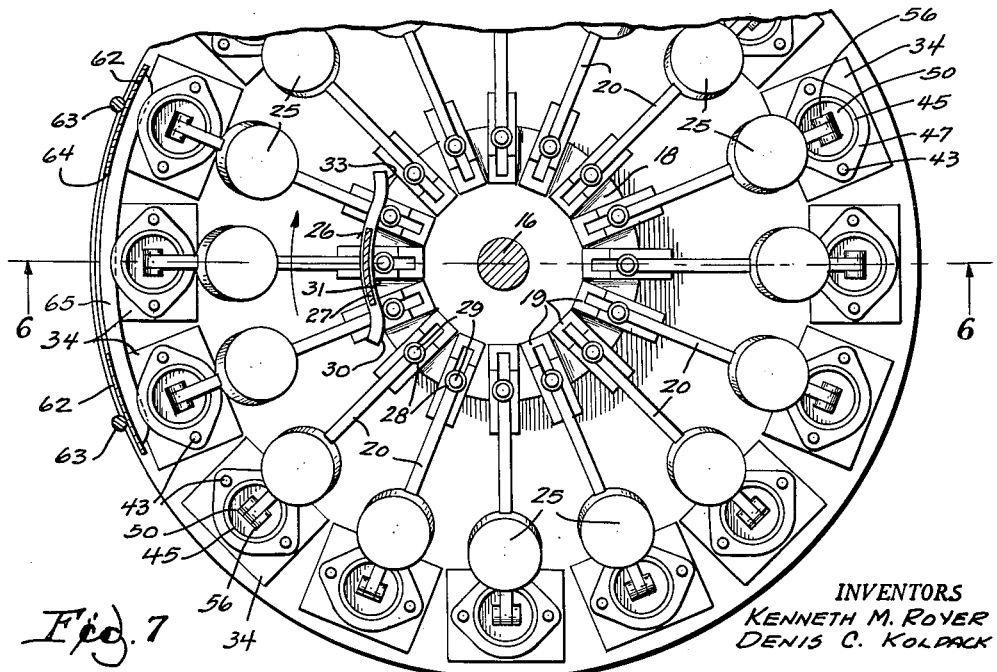
INVENTORS
KENNETH M. ROYER
DENIS C. KOLDACK
Wheeler, Wheeler & Wheeler
ATTORNEYS

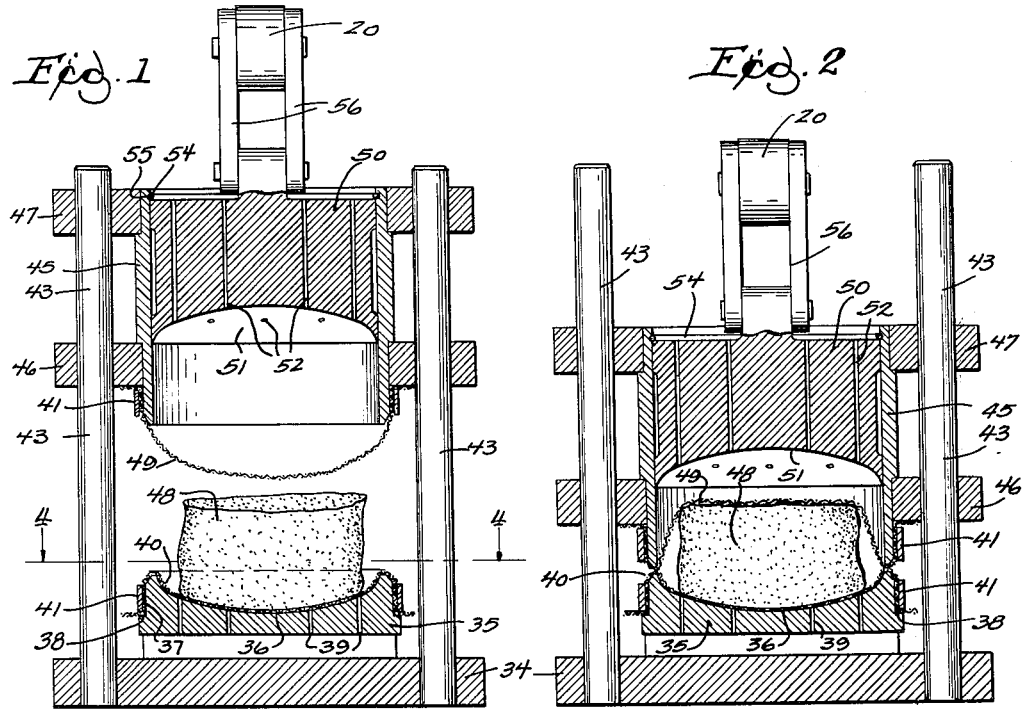
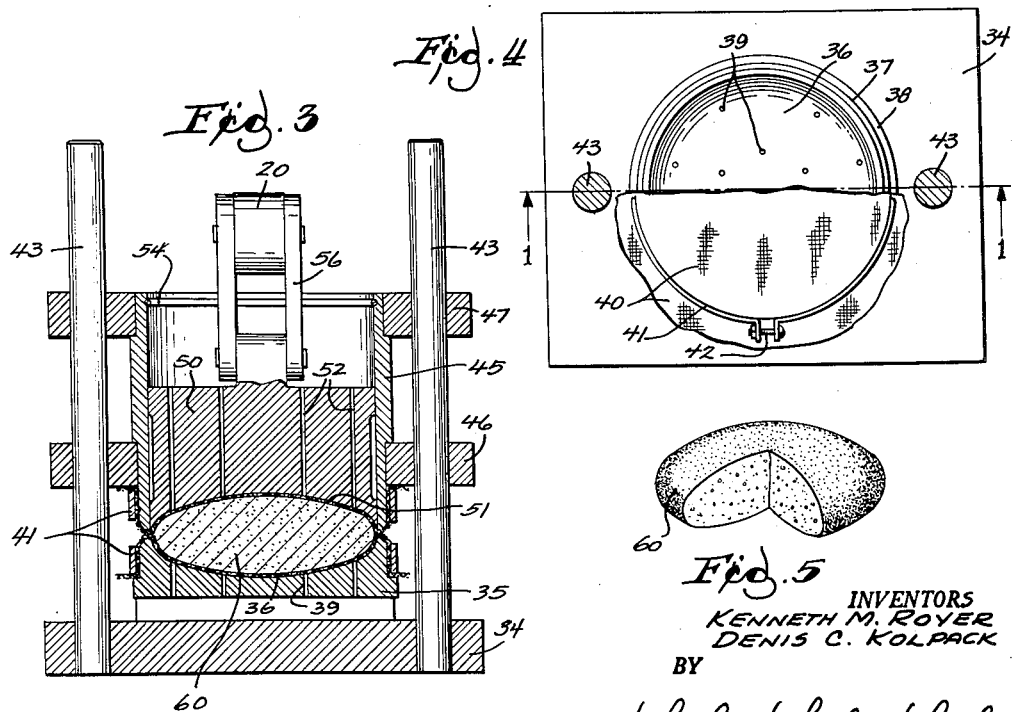

United States Patent Office 3,008,235
Patented Nov. 14, 1961

3,008,235
MOLDING PRESS AND METHOD
Kenneth M. Royer and Denis C. Kolpack, Mayville, Wis., assignors to Purity Cheese Company, Mayville, Wis., a corporation of Wisconsin
Filed Jan. 6, 1958, Ser. No. 707,232
14 Claims. (Cl. 31—44)

This invention relates to a molding press and method. It will be described particularly with reference to the molding of cheese although capable of other usage. Gouda and Edam cheeses are examples of cheese which can be finished in accordance herewith.

In cheese molding usage, appropriate blanks of partially compressed curd are preformed and prepared for molding by heating to a temperature appropriate to the molding pressure.

Whether or not cheese is involved, a workpiece is placed in contact with a concave forming die having a press cloth cover which is replaceable for sanitary reasons but is used in a whole succession of molding operations. A sleeve having a similar press cloth loosely spanning its end and detachably connected with the sleeve is then advanced to engage the press cloth of the sleeve over the workpiece which rests against the press cloth of the first die. Thereafter a second die telescopically reciprocable within the sleeve is advanced into molding pressure engagement with the press cloth of the sleeve to act therethrough upon the workpiece, the pressure being regulated to a predetermined value.

It is noteworthy that the preferred organization is vertical so that both the sleeve and the second die are preferably actuated by gravity. The upper die is raised mechanically following the pressing operation and after it has been raised a predetermined distance it picks up the sleeve, thereby exposing the molded product for removal from the lower die. The upper die and sleeve remain elevated until another workpiece has been placed on the press cloth of the lower die. Thereupon the elevating tension on the upper die is relaxed. The die and the sleeve descend together until the sleeve encircles the workpiece and receives support from the lower die. When the sleeve comes to rest, the upper die continues its descent until the predetermined bias to which it is subject becomes effective to perform the pressing operation.

In the preferred practice of the invention, a number of die and sleeve assemblies are organized upon a turntable, the upper dies and sleeves being retracted at an unloading and loading station and remaining active for compression of the work throughout the remainder of their path on the turntable.

The invention will be described from the standpoint of the preferred horizontal turntable organization but with the understanding that the molding die sets may be used individually and oriented and biased in any desired manner, the horizontal turntable organization not being a requisite.

In the drawings:

FIG. 1 is a view in section on the line 1—1 of FIG. 4 showing a workpiece in place in the open finishing mold, the workpiece being shown in elevation.

FIG. 2 is a view similar to FIG. 1 showing the position of the parts with the sleeve encircling the workpiece, the upper die remaining out of contact with the upper press cloth.

FIG. 3 is a view similar to FIGS. 1 and 2 showing the parts in the position which they occupy during the pressure molding of the workpiece.

FIG. 4 is a plan view of the lower die as it appears in section on the line 4—4 of FIG. 1, the press cloth being broken away.

FIG. 5 is a view in perspective of the molded article, with a segment broken away to expose a cross section to which it has been molded.

FIG. 6 is a view in transverse section on the line 6—6 of FIG. 7 showing a preferred embodiment of the molding machine on a reduced scale as compared with FIGS. 1 to 5.

FIG. 7 is a fragmentary view taken in section on the line 7—7 of FIG. 6, the upper housing being omitted.

The machine comprises a base frame 10 supporting a motor 11 with armature shaft 12 carrying a pinion 13 meshing with a gear 14 to rotate turntable 15 about the column 16. A spool-shaped hub 17 which provides bearing for the turntable on column 16 has a flange at 18 upon which there are mounted channeled brackets 19 to which the arms 20 are pivoted at 21. These arms are bell crank levers connected at their outer ends to the dies hereinafter described and they support the weights 25 which are adjustable lengthwise of the arms to determine the pressure to which the dies will be subject when the arms are not tilted against the bias of such weights to raise the dies.

For tilting the arms in opposition to the weights, a cam 26 is provided. This cam may have the approximate form indicated in FIG. 7. The cam is supported by a bracket 27 from the column 16, as best shown in FIG. 6.

As the turntable rotates, the anti-friction rolls 28 mounted on the upstanding end portions 29 of the respective bell crank levers 20 successively engage the eccentric portion 30 of the cam 26 in a direction to elevate each successive bell crank lever toward the position shown at the left in FIG. 6. The cam portion 31 is concentric with column 16, or substantially so, to maintain in a retracted position the die hereinafter described, and which is supported by the bell crank lever arm 20. At the delivery end 33 of the stationary cam 26, the successive rollers 28 are permitted to move gradually outwardly, thereby lowering the respective arms 20 and the dies connected therewith to advance them toward the fixed die.

On the turntable 15 there is an annular series of die supports 34. On each support 34 is mounted a first die 35 having a concave surface at 36 encircled by a clamping surface 37 which may be generally cylindrical and bounded by a shoulder 38 at its lower margin. The die 35 is desirably, although not necessarily, provided with a number of liquid escape ducts 39 opening downwardly from its concave surface 36. In the molding of cheese, these ducts facilitate escape of whey pressed from the curd. The concave surface is covered by a press cloth 40 removably clamped to the surface 37 by means of a metal hoop 41 in the form of a split ring having its ends bolted together at 42 as best shown in FIG. 4.

Mounted on the die support 34 are posts 43 which provide a way along which the sleeve or cylinder 45 is reciprocable. A convenient and preferred means of guiding the cylinder from the posts includes the provision of flanges 46, 47 fixed to the cylinder and apertured for bearing on the posts. The diameter of the cylinder desirably corresponds exactly to the diameter of the concave surface 36 of the first die 35 so that when the cylinder is advanced as shown in FIG. 2 it will be positioned from the first die about the curd block 48 or other workpiece resting on the press cloth 36.

Detachably connected with the cylinder 45 is a press cloth 49 similar to press cloth 36 and clamped to the outside of the sleeve or cylinder 45 by a split ring clamp 41 identical to that already described.

Reciprocable in the cylinder sleeve 45 is a second die 50 having a concave mold surface 51. Optionally liquid escape ducts 52 are provided to open upwardly. There will seldom be sufficient liquid expressed from the workpiece 48 to fill these ducts, much less overflow the top of the die 50. However, any liquid pressed from the workpiece 48 in an upward direction, and entering the ducts 52 will be discharged from the ducts during the interval of dwell of the die 50 in a retracted position preliminary to the withdrawal of one molded article and insertion of another workpiece.

Retractive movement of die 50 in the cylinder 45 is limited. In the preferred device illustrated, it has been found convenient to use a split ring 54 for this purpose, the ring being engaged conventionally in a groove 55 with which the cylinder sleeve 45 is provided. A link 56 connects the die 50 with one of the bell crank lever arms 20 so that when the bell crank lever arm is raised from the position shown at the right in FIG. 6 to the position shown at the left in FIG. 6, the die 50 will be lifted within the sleeve or cylinder 45 to the limit permitted by the split ring 54. Subsequent upward movement will carry the cylinder sleeve 45 with the upper die to the retracted position in which the parts are shown in FIG. 1.

In this position, the article 60 will be exposed and can be withdrawn from the press cloth of the lower die and a new workpiece 48 can be substituted on that press cloth. In practice, the change is performed manually and to protect the operator from possible injury a guard plate 62 is provided. The guard plate is supported by rods 63 from the bracket 27 of column 16. The guard plate has an aperture at 64 of sufficient extent so that as the guide assembly is in continuous movement on the turntable 15 the operator can reach through the aperture to remove molded articles 16 and substitute an unmolded block 48. The angular extent of the opening 64 is no greater than the angular extent of the cam 26. Thus the operator is required to withdraw his hands from the die before the termination of the dwell of the upper die in its elevated position.

As an additional safety measure, the opening may be spanned by a supporting flange 65 which may conveniently be mounted on the inside of guard plate 62 in the path of advance of some part of the cylinder sleeve assembly. The cylinder sleeve 46 may conveniently be the part obstructed by guard flange 65 to preclude cylinder advance at this zone (see FIG. 6).

After the unmolded block 48 has been positioned, the rotation of the turntable with respect to the cam results in the descent of the sleeve 45 to completely enclose block 48 between the two press cloths 40 and 49. Only thereafter does the upper die 50 descend to mold the workpiece 48 and produce the article 60. It will be observed that neither the descent of the cylinder sleeve 45 nor the descent of the upper die 50 is effected by power. The pressure of the cylinder sleeve 45 is relatively light, since the wall is thin and the total weight of the sleeve and its flanges is not great. The cylinder sleeve lowers the upper press cloth over the workpiece 48 and confines the workpiece against lateral expansion. Molding pressure is provided by the upper die 50, which is subject only to limited bias, in this case the bias being such weight as is imposed thereon by its own mass and that of the lever 20 and the weight 25 which is adjustable along the lever. The upper die never contacts the lower die, its advancing movement being arrested by the work at a level depending on the mass of the blank. Thus in every operation a side wall portion of the mold is provided by sleeve 45. The axial length of the sleeve portion which is effective will vary according to requirements. While any desired amount of pressure can be used, the bias can be very accurately predetermined by the organization disclosed.

While the invention is primarily concerned with the finishing of cheese, the molding apparatus as herein disclosed is capable of other usage within the scope of the claimed invention.

We claim:

1. A method of molding cheese curd, said method comprising preliminarily molding cheese curd and placing the preliminarily molded cheese curd between the central portions of separate press cloths freely movable to and from said curd and to and from each other, holding the margins of the respective cloths while effecting relative movement between the central portions thereof to engage the curd between said central portions, exerting molding pressure through the central portions of the press cloths upon the curd, releasing the pressure, and separating the press cloths bodily to expose the molded curd.

2. A method of molding initially discrete cheese curd particles to express liquids and to constitute a unitary object, said method comprising preliminarily pressing said particles to form a loosely bound workpiece, placing the workpiece between central portions of separate press cloths free of the workpiece and of each other, holding said press cloths separately by their respective margins while effecting relative movement therebetween to engage the central portions of the cloth with the workpiece, exerting through the press cloths upon the workpiece sufficient pressure to expel residual liquid and to consolidate the particles to constitute said object, releasing the pressure, and separating the press cloths bodily to expose the object.

3. The method of claim 2 in which the recited steps are repeated to form a series of objects between the same press cloths.

4. A method of cheese manufacture which comprises the steps of preliminarily pressing particles of cheese curd to form a succession of loosely bound workpieces, inserting the workpieces successively between molding dies having opposed work-pressing faces, mounting separate press cloths between said dies, separating said press cloths to receive successive workpieces and advancing one of said press cloths toward the workpiece and toward the other press cloth in advance of the closing of said dies to engage each successive workpiece centrally between said press cloths in advance of the closing of said dies on the workpiece, and subsequently opening the dies and separating the press cloths to expose each successive molded product for withdrawal.

5. In a cheese molding machine for acting on preformed cheese curd, the combination with complementary cup-shaped molding dies having opposed work-pressing faces having openings for the escape of liquids, and means mounting said dies for relative movement in said machine, of separate press cloths spanning the respective faces free of connection with such faces, and means on the machine individual to the respective cloths and outside of the area of said faces having marginal connection with said cloths for positioning said cloths in face-spanning locations, one such means being movable with respect to the other and having means for actuating it to advance and retract one of said cloths with respect to the other.

6. The device of claim 5 in which the cloth positioning means connects one of said cloths to one die, the relatively movable positioning means for the other cloth comprising a ring movable independently of the other die.

7. In a machine for pressing preformed masses of cheese curd, the combination with a first die having a molding face, of a cylinder sleeve movable to and from said die and adapted to encircle said face, a second die having a complementary face and reciprocable within the sleeve and movable toward and from the first die, and means mounting the cylinder sleeve and second die for movement to and from the first die, means for effecting engagement of the cylinder sleeve with the first die in advance of operative engagement of the second die with work disposed between said dies, and press cloths having marginal portions respectively connected with the first die and with said sleeve in the path of the second die, the respective press cloths being free of connection with each other and having their central portions spaced in the movement of said sleeve away from said first die, whereby to permit a molded cheese article to be withdrawn from between said cloths and a successive mass of curd inserted between the central portions of said cloths, the central portions of said cloths being engageable oppositely with successive cheese curd masses in the movement of said sleeve toward the first die preliminary to the pressing of each successive mass between said cloths in the subsequent movement of the second die toward the first die within said sleeve.

8. In a machine for pressing successive preformed masses of cheese curd between separate press cloths which engage such masses successively, the combination with a first die having a concave work-receiving face, of a first press cloth spanning said face and connected with the first die, a sleeve provided with means mounting it for movement toward and from the first die, a second press cloth connected with the sleeve and spanning the face of the first die for engagement with work received thereon, the internal diameter of the sleeve being of such dimensions as to be adapted to engage the first die about said face and about work received thereon, and a second die reciprocable toward and from the first die within said sleeve, and means whereby movement of the second die into final compression of said work occurs after said sleeve is seated about the work, said second die acting upon said work through the second mentioned sleeve and the second press cloth connected therewith.

9. In a machine for subjecting successive masses of cheese curd to molding pressure, the combination with relatively movable first and second dies and means for moving the second die with respect to the first die, of a sleeve embracing the second die and movable in the direction of movement thereof, the sleeve having limited movement independently of the second die and being adapted to engage the first die in advance of the final movement of the second die toward the first die, and a press cloth entirely independent of the first die and having marginal portions connected with said sleeve for movement therewith, said press cloth having an intermediate portion disposed in the path of movement of the second die toward the first die and positioned to engage successive masses of cheese curd, and means for transmitting retractive movement from the second die to said sleeve and press cloth for the withdrawal of said press cloth from each successive molded article to permit the removal thereof and the substitution of another mass of curd.

10. The device of claim 9 in which the means for effecting movement of the second die comprises means for withdrawing the second die from the first die, the second die being biased for return movement toward the first die and the sleeve and second die having complementary parts engageable in the withdrawing movement of the second die from the first die to disengage the sleeve from the first die, the sleeve also being biased toward reengagement with the first die.

11. The device of claim 9 in which the respective dies have opposed oppositely concave surfaces, the first die having a detachable press cloth spanning its concave surface.

12. The device of claim 11 in further combination with a turntable upon which the first die is mounted, the turntable having a lever pivoted to it and rotatable with it and with which the second die is connected and a fixed cam in the path of rotation of the lever with the turntable, the lever having a cam follower engageable with said cam to effect lever movement in a direction for the retraction of the second die from the first die in the course of turntable rotation, the cam follower being released from the cam in the course of continued turntable rotation for the return of the second die toward the first die.

13. A machine of the character described comprising the combination with a column and a turntable rotatable with respect thereto, of an annular series of concave dies mounted on the turntable, a press cloth covering each die and having means detachably clamping it to the die to span the concave surface thereof, a second die having a concave surface opposite that of the first die, there being a second die for each of the first mentioned dies of said annular series, levers pivotally connected to the turntable for rotation therewith and for movement in planes generally radial respecting the turntable, each of said levers having a connection with one of the second dies aforesaid, sleeves reciprocably mounted on the second dies and provided at their lower ends with press cloths in the path of the second dies, relatively fixed cam means, the levers having cam follower means effective upon rotation of the turntable to engage the cam means for oscillating said levers in a direction to retract their respective second dies and sleeves from the dies first mentioned, said cam means being operative consequent upon continued rotation of the turntable for lowering the sleeves and second dies respecting the dies first mentioned.

14. The device of claim 13 in which guard means fixed with respect to the turntable has an opening through which the dies first mentioned are exposed only during the period in which the second mentioned dies and sleeves are elevated.

References Cited in the file of this patent

UNITED STATES PATENTS

| | | |
|---|---|---|
| 580,577 | Kerr | Apr. 13, 1897 |
| 2,266,336 | Royer | Dec. 16, 1941 |
| 2,373,781 | Richardson | Apr. 17, 1945 |
| 2,554,734 | Gehm | May 29, 1951 |
| 2,820,423 | Catuccio | Jan. 21, 1958 |